United States Patent [19]
Lee et al.

[11] 3,794,739
[45] Feb. 26, 1974

[54] CONTROLLED FERMENTATION AND PREVENTION OF UNDESIRABLE BACTERIAL GROWTH IN FOOD

[75] Inventors: Wei Hwa Lee; Hans P. Reimann; Abdul J. Al-Mashat, all of Davis, Calif.

[73] Assignee: The United States of America as represented by the Secretary of Agriculture, Washington, D.C.

[22] Filed: Jan. 26, 1971

[21] Appl. No.: 109,960

[52] U.S. Cl. ................... 426/8, 426/56, 426/240
[51] Int. Cl. ................... A22c 18/00, A23b 1/00
[58] Field of Search.. 99/7, 107, 109, 150, 157, 108

[56] References Cited
UNITED STATES PATENTS

| | | | |
|---|---|---|---|
| 2,744,017 | 5/1956 | Baldwin | 99/150 |
| 2,807,549 | 9/1957 | Brasch et al. | 99/109 X |
| 2,945,766 | 7/1960 | Chaiet | 99/107 |
| 3,041,174 | 6/1962 | Ehlert | 99/107 X |

OTHER PUBLICATIONS

Desrosier, "The Technology of Food Preservation," 1959, Published by the AVI Publishing Co., Inc., Westport, Conn., Pages 341–344, Inclusive, Article Entitled Radiation Effects On Micro–Organisms.

*Primary Examiner*—Hyman Lord

[57] ABSTRACT

Food is inoculated with lactic acid producing bacterial cells which, though previously rendered non-viable, still have the capacity to produce acid. If controlled fermentation of the food is desired, the inoculated food is incubated under suitable conditions. If safeguarding against food poisoning bacteria is desired, the inoculated food is refrigerated to inhibit lactic acid production. If, in the latter case, the food is subsequently exposed to higher temperatures, acid production occurs and inhibits production of food poisoning bacteria.

3 Claims, No Drawings

CONTROLLED FERMENTATION AND PREVENTION OF UNDESIRABLE BACTERIAL GROWTH IN FOOD

This invention relates to controlled fermentation in foods and food products. More particularly, it relates to controlled fermentation in foods by the use of microorganisms which have been rendered non-viable. Still more particularly, it relates to controlled fermentation of foods by use of lactic acid producing bacteria that have been made non-viable by techniques that do not interefere with their acid producing capacity.

Although there is no way of knowing the exact extent of staphylococcal food poisoning in the United States, authorities agree that it is a serious and prevalent cause of gastroenteritis and it is estimated that at least one-third of the cases of staphylococcal food poisoning in the United States are caused by eating meat or meat products in which the staphylococci had grown.

Therefore, any method or technique that would lower or completely eliminate the occurrence of this hazard in packaged foods would be very valuable to the food processing industry.

Consequently, it is an object of this invention to provide a means of controlling fermentation in foods and food products.

Another object of this invention is to provide means of fermenting foods which are not traditionally fermented.

Still another object of this invention is to provide a method of preventing growth of bacteria that cause foodborne diseases.

A still further object is to provide a means of handling perishable food that will prevent multiplication of food poisoning and other acid sensitive bacteria.

In general, according to this invention lactic acid producing bacteria are grown in a suitable medium until the maximum production of acid forming enzymes is reached, after which the bacterial cells are harvested, packed in suitable containers and made non-viable by irradiation. The non-viable bacterial preparation and, if needed, a fermentable carbohydrate is then added to the food. If fermentation is desired, the food is incubated under conditions conducive to rapid acid production. If fermentation is not desired, that is, if the purpose is to safeguard against food poisoning bacteria, the inoculated food is cooled to inhibit acid production by the lactic acid bacteria preparation. In the latter case, if the food is subsequently exposed to higher temperatures, acid production occurs and inhibits food poisoning bacteria.

The process of this invention uses lactic acid producing bacteria that are approved for use in foods, such as *Pediococcus cerevisiae, Streptococcus lactis, Lactobacillus acidophilus* and *Lactobacillus plantarum*. The bacteria are grown in a suitable medium and when the maximum production of acid forming enzymes is reached the cells are harvested by centrifugation, mixed with glucose or other carrier (e.g., skim milk) and then frozen or lyophilized. The cell preparation is then hermetically packed in suitable containers and irradiated with gamma or beta rays at dose levels of 1 to 3 megarad. The bacterial preparation is added to the food in amounts equivalent to $10^8$ to $10^{10}$ cells per gram of food. If carbohydrate is not naturally present in the food, one percent or more of a fermentable carbohydrate is added. The inoculated food is then either incubated or refrigerated, depending on whether the purpose is to controllably ferment the food or to safeguard against food poisoning bacteria.

The preferred carbohydrate for the purposes of this invention is glucose. The quantity of added carbohydrate is important and depends on the acidity and buffering capacity of the food. The amount required is determined by pH measurements; the pH of the food after fermentation should be 4.5 to 5.0. The amount of lactic acid bacteria preparation used is also important and is also determined by measurement of the pH of the fermented food sample. For convenience sake, the cell preparation can be assigned a value for activity such as m moles acid per gram of cell preparation.

In contrast to traditional fermentation procedures, the fermentation process of this invention does not depend on multiplication of the fermenting organism in the food. Production of acid or other compounds by the preformed enzyme system present in non-viable cells takes place rapidly when the temperature is suitable. Thus, the use of non-viable cells provides the operator with an excellent means for controlling the progress of the fermentation. In addition, in the usual fermentation procedures the fermentation organisms are occasionally overgrown by other contaminating microorganisms or the growth conditions for the fermenting organism are not suitable because of the composition of the host food, that is, the food may have too high a salt content or too low a water content or some other condition that prevents or arrests fermentation. In such cases the food can be controllably fermented by the process of this invention.

In addition to its use in controlling the rate and progress of fermentation, the present invention is also useful in preventing the growth of spoilage and food poisoning bacteria such as *Clostridium, Staphylococcus*, and *Salmonella*. When food which has been inoculated with the non-viable lactic acid bacteria of this invention is exposed to high storage temperatures, the non-viable bacteria produce acid, thus inhibiting the growth of the food poisoning bacteria.

The lactic acid producing bacterial cells of this invention were rendered non-viable by irradiation with gamma rays at a dosage level of 1 megarad. However, other treatments such as irradiation with beta rays, with X-rays, or with ultraviolet rays or exposure for a short time to a very high temperature may be used to render the cells non-viable. It is also conceivable that treatment with $HNO_2$ or hydroxylamine or other chemicals which inactivate nucleic acids would accomplish the desire result.

The following examples demonstrate the feasibility of the present invention and how it can be used. The examples are not intended to be limiting because the invention can be applied in almost all conventional food and industrial fermentations.

The examples show the influence of irradiated killed *Pediococcus cerevisiae* cell prepration on growth and toxin production of *Clostridium botulinum* type A and type E and on *Staphylococcus aureus* in meat.

EXAMPLE 1. Commercial canned ham

Sliced ham which had been cleaned, washed and treated with ethanol was cut into circular slices having diameters equal to the internal diameter of a petri dish. Two slices, average weight 15–16 gm. each, were placed in each of a number of petri dishes. The test petri dishes were inoculated first with pathogens, some with approximately $10^6$ *C. botulinum* spores, then with *Pediococcus cerevisiae* suspension in glucose to make 10⁹ cells/gram meat and 1.0 percent glucose. Control plates with pathogens but no *Pediococcus* and others with *Pediococcus* and no pathogens were also tested. The inoculated plates and controls were incubated anaerobically and aerobically at 30° C for 4 days. Duplicate plates were exposed to the same conditions for organoleptic tests.

Production of *C. botulinum* toxin was tested by mice injection. After incubation each sample was blended with 120 ml sterile distilled water in a mason jar and homogenized for 2 minutes in a food blender. Blended samples were kept at 20° C for 4 hours to allow settling. 0.25 ml of the supernates were injected intraperitonically into mice, and deaths which occurred within 48 hours were recorded. Staphylococcal growth and toxin production was tested by gel diffusion techniques and by staining with fluorescent antibody.

No toxin was found in the supernatants from meat inoculated with *C. botulinum* spores together with *Pediococcus cerevisiae* cell preparation. The control samples with meat and only *C. botulinum* spores was found to contain toxin.

Stained smears from meat containing *S. aureus* and *Pediococcus cerevisiae* showed no evidence of toxin production. Smears from meat inoculated with *S. aureus* alone showed toxin production. This result was confirmed later by gel diffusion technique.

No significant change in flavor of ham except a slight diacetyl flavor (buttermilk flavor) was noticed in samples inoculated with *Pediococcus* cell preparation alone or with Pediococci plus pathogenes. Samples with pathogenes and no pediococci and samples of plain ham with no added cells were very deteriorated.

EXAMPLE 2. Turkey and beef.

10 gram samples of freshly packed smoked vacuum packed turkey (pH 6.3, brine concentration 3.5 percent) and freshly ground beef (pH 6.5) were inoculated with $10^3$ Botulinum A spores or $10^6$ cells of enterotoxin A producing Staphylococci. To one set of these samples was added $10^9$/gm irradiation killed *Pediococcus cerevisiae* and 1 percent glucose. The inoculated packs were incubated anaerobically at 30° C for up to 7 days and examined for pH and growth of pathogenes. After 2 days the pH values were as follows:

| | TURKEY | BEEF |
|---|---|---|
| With Pediococci | 5.0 | 4.9 |
| Without Pediococci | 5.6 | 6.0 |

More than 99 percent of Staphylococci were killed in two days in the sample with added glucose and *Pediococcus cerevisiae* preparation, and the kill was practically complete after 7 days.

EXAMPLE 3. Production of lactic acid.

Production of acid by Pediococcus cell preparation was studied in APT broth (J. Bacteriology 62, 599, 1951) 100 ml of broth was inoculated with Pediococcus cell preparation ($10^9$/ml) and incubated at 37° C. The pH of the preparation was continuously recorded by glass electrode. This was repeated several times and the average time required to drop the pH of the media from 6.8 to 4.3 was 8–12 hours. The amount of L-lactic acid produced was determined enzymatically with lactic dehydrogenase and was around 560 mg L-lactic acid percent. The total acidity in the broth was found to be equivalent to around 800 mg lactic acid percent.

(*Pediococcus cerevisiae* is homo-fermentative and produces optically inactive lactic acid.)

EXAMPLE 4. Production of acid in meat.

15 gram portions of ground beef were placed in petri dishes, mixed with $10^9$ cells/gm *Pediococcus* preparation and 1 percent glucose, and incubated for 48 hours at 30° C. Control sample with no *Pediococcus* was also incubated.

L-lactic acid was determined with lactic dehydrogenase in the fresh meat and in the incubated meats. The amounts found were as follows:

L-lactic acid in fresh ground beef—510 mg percent

L-lactic acid present in ground beef after 48 hour incubation 30° C—50 mg percent L-lactic acid in ground beef with 1 percent glucose and $10^9$ cell/gm of Pediococci after 48 hours at 30° C—655 mg percent When the experiment was repeated with sterilized ground beef, the results were identical except there was no change in the amount of L-lactic acid in the sample incubated without Pediococci.

We claim:

1. A method of controlling fermentation in food comprising the following steps:

a. inoculating the food with an amount of non-viable, lactic acid producing bacterial cells equivalent to about $10^8$ and $10^{10}$ cells per gram of food, the bacterial cells containing a preformed enzyme system from having been previously grown in a suitable medium until the maximum production of acid forming enzymes was reached, then packaged and irradiated with from 1 to 3 megarad of gamma rays to render said cells non-viable while preserving the biosynthetic function and integrity of the preformed enzyme system within the cells;

b. adding about 1.0 percent of fermentable carbohydrate to the inoculated food; and c. anaerobically incubating said inoculated food under conditions to activate the aforesaid preformed enzyme system, thereby initiating glycolysis and converting glycose in said carbohydrate to lactic acid.

2. A method of preventing the growth in food of bacteria that cause food-borne diseases comprising inoculating said food with an amount of non-viable, lactic acid producing bacterial cells equivalent to about $10^8$ to $10^{10}$ cells per gram of food, said bacterial cells containing a preformed enzyme system, and storing said inoculated food at a temperature low enough to inhibit activation of the preformed enzyme system within the non-viable bacterial cells until said inoculated food is subsequently exposed to higher temperatures, whereby said higher temperatures activate the preformed enzyme system and initiate glycolysis to produce lactic acid, thereby inhibiting the production of food poisoning bacteria.

3. A method of preventing the growth in food of bacteria that cause food-borne diseases comprising the following steps:

a. inoculating the food with an amount of non-viable lactic acid producing bacterial cells equivalent to about $10^8$ to $10^{10}$ cells per gram of food, the bacterial cells containing a preformed enzyme system from having been previously grown in a suitable medium until the maximum production of acid forming enzymes was reached, packaged and irradiated with from 1 to 3 megarad of gamma rays to render said cells non-viable while preserving the biosynthetic function and integrity of the preformed enzyme system within the cells;

b. adding about 1.0 percent of fermentable carbohydrate to the inoculated food; and c. cooling and storing said inoculated food to a temperature low enough to inhibit activation of the preformed enzyme system within the non-viable bacterial cells until said inoculated food is subsequently exposed to higher temperatures, whereby said higher temperatures activate the preformed enzyme system and initiate glycolysis to produce lactic acid, thereby inhibiting the production of food poisoning bacteria.

* * * * *